UNITED STATES PATENT OFFICE.

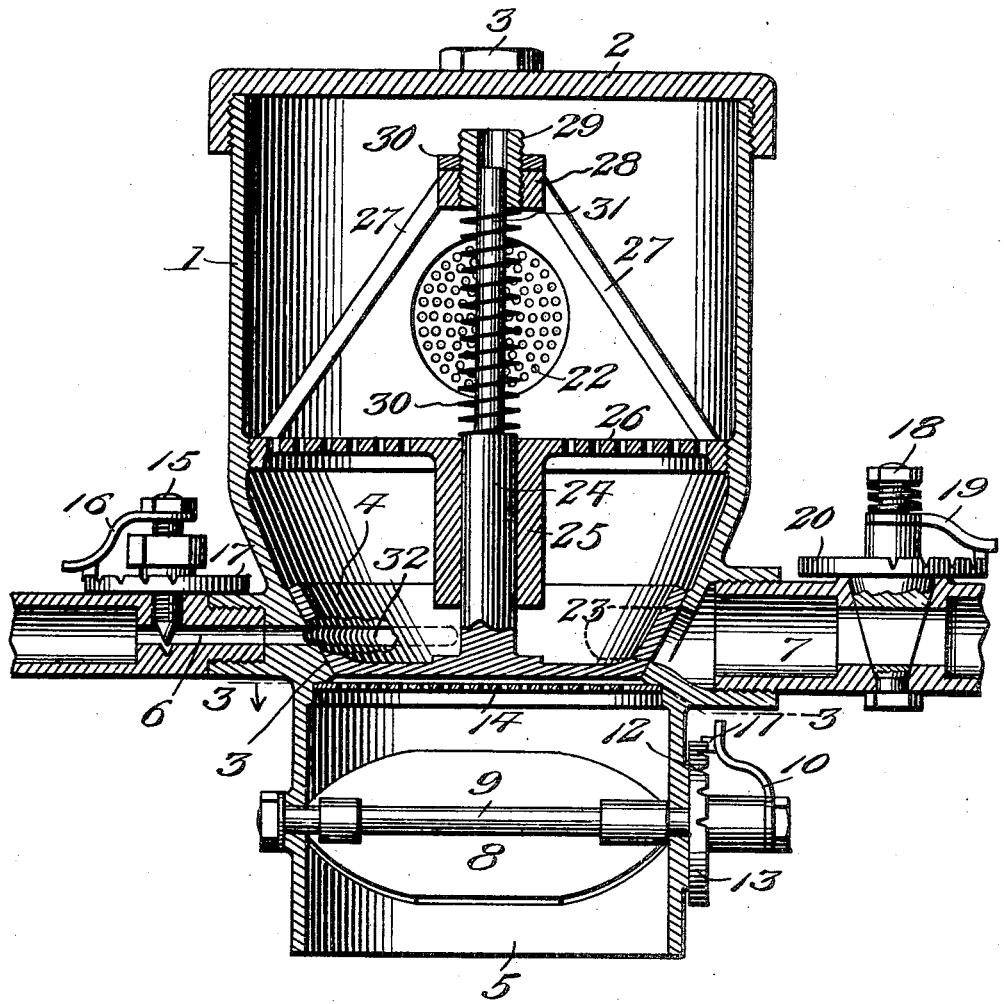

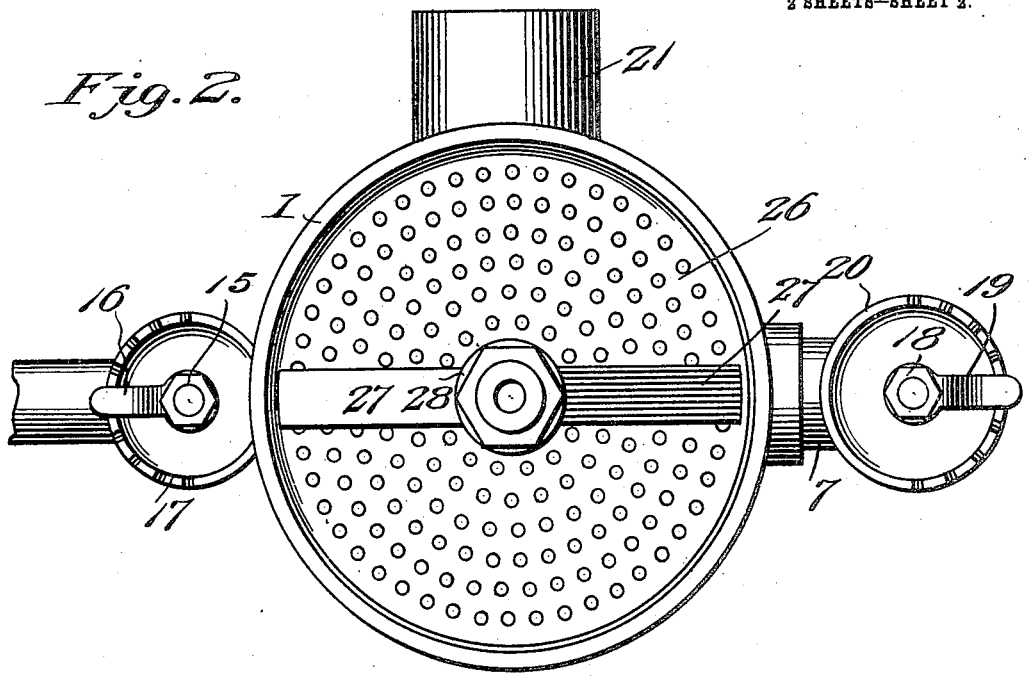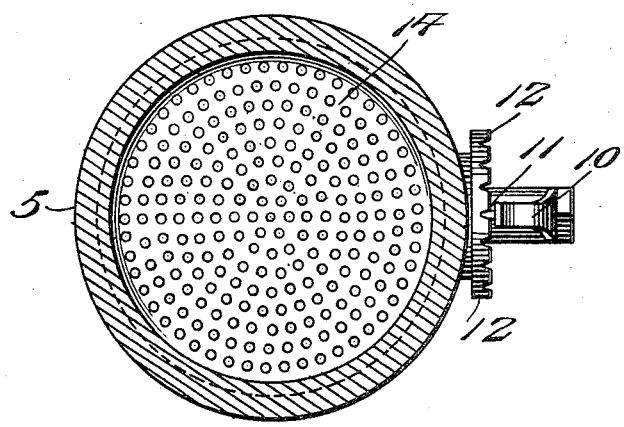

JAY CLAUDE LEWIS, OF SHELBY, OHIO.

CARBURETER.

No. 817,721.  Specification of Letters Patent.  Patented April 10, 1906.

Application filed February 10, 1905. Serial No. 245,122.

*To all whom it may concern:*

Be it known that I, JAY CLAUDE LEWIS, a citizen of the United States, residing at Shelby, in the county of Richland and State of Ohio, have invented new and useful Improvements in Carbureters, of which the following is a specification.

This invention relates to carbureters.

The object of the invention is to improve the construction of such devices by rendering them capable of interchangeable use with either gas or a hydrocarbon liquid.

With the foregoing and other objects in view, which will appear as the description proceeds, the invention resides in the novel combination and arrangement of parts and in the details of construction hereinafter described as a practical embodiment thereof.

In the accompanying drawings, forming a part of this specification, Figure 1 is a vertical section through a carbureter constructed in accordance with the invention. Fig. 2 is a plan view thereof with the cover-plate removed. Fig. 3 is a horizontal section on the line 3 3 of Fig. 1.

Like reference-numerals indicate corresponding parts in the different views.

The reference-numeral 1 indicates a casing which may be of any suitable size and construction. The upper end of the casing 1 preferably is closed by a cover-plate 2, having a nut 3 thereon for the reception of a wrench or other suitable implement in loosening and removing the cover-plate. At its lower end the casing 1 is provided with a valve-seat 3, which, preferably, is cone-shaped, as shown. Communicating with the valve-seat 4 is an air-inlet 5, a hydrocarbon-liquid inlet 6, and a gas-inlet 7, which is in communication with any suitable source of natural or artificial gas. The air-inlet 5 is provided with a controlling-valve 8, mounted upon a shaft 9, having on the outer end thereof a resilient or spring handle 10, provided with a lug 11, adapted to coöperate with any one of a series of notches 12 in an annular member 13. The air-inlet 5 is also provided with a perforated diaphragm 14 to prevent the entrance of impurities to the casing 1 of the carbureter.

The hydrocarbon-liquid inlet 6, which communicates with the cone valve-seat 4, is controlled by a suitable needle-valve 15, having a resilient handle 16, coöperating with an annular member 17, as described with respect to the air-inlet valve 8. The gas-inlet 7 is controlled by a turn valve or cock 18, having a resilient handle 19, coöperating with an annular member 20.

The casing 1 is provided with an outlet 21, which communicates with the engine-cylinder and is provided with a perforated diaphragm 22, as shown in Fig. 1.

Coöperating with the cone-shaped valve-seat 3 in the casing 1 and adapted to control the air-inlet 5, the hydrocarbon-liquid inlet 6, and the gas-inlet 7 is a cone-shaped valve 23, having a stem 24, which extends upward through a bushing 25, formed on or secured to the central portion of a perforated diaphragm 26, removably secured in the casing 1. Extending upwardly from the diaphragm 26 is a plurality of arms 27, which support at their upper ends a collar 28, into which is screwed a bushing 29, a suitable lock-nut 30 being provided to hold the bushing 29 securely within the collar 28. The upper end 31 of the valve-stem 24, which is decreased in size, extends through the bushing 29, as shown in Fig. 1.

If desired, the cone-shaped valve-seat 4 may be formed with one or more annular grooves, such as 32, said grooves permitting the liquid or gaseous fuel to surround the valve-seat in readiness for the opening of the valve and the gas-inlet 7.

Constructed as above described the operation of the improved carbureter is as follows: If it be desired to use hydrocarbon liquid, the valve 18, controlling the gas-inlet 7, is closed, and the valves 8 and 15, controlling the air and hydrocarbon-liquid inlets 5 and 6, are opened. For this reason the hydrocarbon liquid is permitted to enter the groove 32 in the cone valve-seat 4, and as soon as the valve 23 is opened by suction on the stroke of the piston in the engine-cylinder the hydrocarbon liquid flows down upon the diaphragm 14, where it is mixed with the air entering the inlet 5 and passing up into the casing 1. If it be desired to employ natural or artificial gas instead of the vapor generated from the hydrocarbon liquid, the valve 15 is closed and the valve 18 is opened, thus permitting the entrance of gas from the inlet 7 to be mixed with the air entering from the inlet 5.

From the foregoing description it will be apparent that the single cone-shaped valve 23 serves to control the air-inlet, the hydrocarbon-inlet, and the gas-inlet.

The reduced portion 31 of the valve-stem 24 is surrounded by a coil-spring 33, which bears at its upper end against the bushing 29 and serves to maintain the valve normally in closed position.

It will be understood that an engine equipped with the improved carbureter of this invention can be used interchangeably with natural or artificial gas or hydrocarbon vapor, as desired. Furthermore, the improved carbureter can be used with a mixture of liquid and gaseous fuel.

Changes in the precise embodiment of invention illustrated and described may be made within the scope of the following claim without departing from the spirit of the invention or sacrificing any of its advantages.

Having thus described the invention, what is claimed as new is—

A carbureter comprising a casing, a coned valve-seat therein, a valved air-inlet communicating with said valve-seat and having a perforated diaphragm therein, a valved hydrocarbon-liquid inlet communicating with said valve-seat, a valved gas-inlet communicating with said valve-seat, a perforated diaphragm in said casing having a bushing, a coned valve coöperating with said coned valve-seat and controlling the three inlets, a stem connected with said coned valve and projecting through the bushing of said perforated diaphragm, supporting-arms on said last-mentioned diaphragm, a collar supported by said arms, a bushing connected with said collar and surrounding the upper end of said valve-stem, and an outlet from said casing having a perforated diaphragm therein.

In testimony whereof I affix my signature in presence of two witnesses.

JAY CLAUDE LEWIS.

Witnesses:
N. B. MABEE,
CHARLES J. ANDERSON.